United States Patent
Zhang (10) Patent No.: US 8,935,149 B2
(45) Date of Patent: Jan. 13, 2015

(54) METHOD FOR PATTERNIZED RECORD OF BILINGUAL SENTENCE-PAIR AND ITS TRANSLATION METHOD AND TRANSLATION SYSTEM

(76) Inventor: Longbu Zhang, Beijing (CN)

( * ) Notice: Subject to any disclaimer, the term of this patent is extended or adjusted under 35 U.S.C. 154(b) by 239 days.

(21) Appl. No.: 13/390,331

(22) PCT Filed: May 10, 2010

(86) PCT No.: PCT/CN2010/000658
§ 371 (c)(1),
(2), (4) Date: Feb. 13, 2012

(87) PCT Pub. No.: WO2011/017902
PCT Pub. Date: Feb. 17, 2011

(65) Prior Publication Data
US 2012/0232882 A1   Sep. 13, 2012

(30) Foreign Application Priority Data
Aug. 14, 2009   (CN) .......................... 2009 1 0162384

(51) Int. Cl.
*G06F 17/28*   (2006.01)

(52) U.S. Cl.
CPC .................................. *G06F 17/2827* (2013.01)
USPC ....................................... 704/2; 704/3; 704/4

(58) Field of Classification Search
None
See application file for complete search history.

(56) References Cited

U.S. PATENT DOCUMENTS

| | | | | |
|---|---|---|---|---|
| 5,867,811 A | * | 2/1999 | O'Donoghue ..................... | 704/1 |
| 7,353,165 B2 | * | 4/2008 | Zhou et al. ........................ | 704/5 |
| 8,594,992 B2 | * | 11/2013 | Kuhn et al. ....................... | 704/2 |
| 2002/0040292 A1 | * | 4/2002 | Marcu ............................... | 704/4 |
| 2002/0198701 A1 | * | 12/2002 | Moore ............................... | 704/2 |
| 2003/0061023 A1 | * | 3/2003 | Menezes et al. .................. | 704/4 |
| 2006/0287847 A1 | * | 12/2006 | Moore ............................... | 704/8 |

FOREIGN PATENT DOCUMENTS

| | | |
|---|---|---|
| CN | 101034394 A | 9/2007 |
| CN | 101201820 A | 6/2008 |
| CN | 101248415 A | 8/2008 |

OTHER PUBLICATIONS

International Search Report of International PCT Application No. PCT/CN2010/000658, dated Aug. 19, 2010.

* cited by examiner

*Primary Examiner* — Jesse Pullias
(74) *Attorney, Agent, or Firm* — J.C. Patents (57) ABSTRACT

A method for a patternized record of a bilingual sentence-pair, for recording a source sentence and a corresponding target sentence onto a record medium in a mapping manner, comprising: recording a source sentence into a first part in the record medium, and recording a target sentence into a second part in the record medium; recording at least one patternized unit in at least one of the first part and the second part; in the patternized unit, a content of a unit in target sentence and information of a corresponding unit in source sentence are recorded in a predetermined format; wherein the patternized unit comprises: a source portion, a target portion, a POS portion, an attribute portion, a portion of serial number of a unit, or any combination thereof; wherein each portion in the patternized unit can be identified automatically by a computer. The translation method and translation system base on the bilingual patternized sentence-pair are also disclosed.

15 Claims, 10 Drawing Sheets

Fig. 1A

Source Text  separator  Target Text
he bought a gold_watch for his wife .^ 他为他的妻子买了一块金表。

Fig. 1B

Source Text　　　　　　　　　　　　separator　Target Text
he bought a gold_watch for his wife .^ {\he|0|他/}为{\his|5|他的/} {\wife|6|妻子/}买了一块{\gold watch|3|金表/}。

Fig. 2A

A: {\he|pron/} bought a {\gold_watch|noun/} for {\his|prond|/} {\wife|noun|/} .
B: {\he|0|他/}为{\his|5|他的/} {\wife|6|妻子/}买了一块{\gold watch|3|金表/}。

Fig. 2B

File 1:

Source Text
{\he|pron/} bought a {\gold_watch|noun/} for {\his|prond|/} {\wife|noun|/} .

File 2:

Target Text
{\0|他/}为{\|5|他的/} {\|6|妻子/}买了一块{\|3|金表/}。

Fig. 2C

Sheet of Database

| source text | Target text |
|---|---|
| he bought a gold_watch for his wife . | {\he|0|他/}为{\his|5|他的/}{\wife|6|妻子/}买了一块{\gold watch|3|金表/}。 |

Fig. 3A

Sheet of Database

| No. | Sentence |
|---|---|
| 1 | {\he|pron/} bought a {\gold_watch|noun/} for {\his|prond|/} {\wife|noun|/} . |
| 2 | {\he|0|他/}为{\his|5|他的/}{\wife|6|妻子/}买了一块{\gold watch|3|金表/}。 |

Fig. 3B

Sheet 1 of Database：

| Source Text |
|---|
| {\he|pron/} bought a {\gold_watch|noun/} for {\his|prond|/} {\wife|noun|/} . |

Sheet 2 of Database：

| Target Text |
|---|
| {\0|他/}为{\|5|他的/} {\|6|妻子/}买了一块{\|3|金表/}。 |

Fig. 3C

| Number of Words | Tag of Change | Grade of Quality | User Name | Update Date | Code of Language |
|---|---|---|---|---|---|
| 029 | N\|No Change Y\|Changed | 1\|* Translation 2\|**Correction 3\|***Check | Logan88 | 031121 | 01\|Eng-Chn |

Example of Additional Information：29|N|2|Logan88|031121|01

Fig. 4

I have promise to help them .^{\I|0|我/}已经答应帮助{\them|5|他们/}。
they decide not to go .^{\they|0|他们/}决定不去了。
did you remember to shut the window ?^{\you|1|你/}记得关上{\window|6|窗户/}了吗？
he agree to pay for it .^{\he|0|他/}同意支付{\it|5|其/}费用。
have you to go to school today ?^{\you|1|你/}{\today|6|今天/}必须上学吗？
would you care to go for a walk ?^{\you|1|你/}有意去散散步吗？
he pretended no to see me .^{\he|0|他/}假装没有看见{\me|5|我/}。
he want me to be early .^{\he|0|他/}想要{\me|2|我/}早到。
      I ask him not to do it .^{\I|0|我/}要求{\him|2|他/}不要做这件事。
I told the servant to open the window .^{\I|0|我/}吩咐{\servant|3|仆人/}打开{\window|7|窗口/}。
please help me to carry this box .^请帮{\me|2|我/}携带{\this|5|这个/}{\box|6|箱子/}。
he like his wife to dress well .^{\he|0|他/}喜欢{\his|2|他的/}{\wife|3|太太/}穿着漂亮。
your teacher expect you to work hard .^{\your|0|你的/}{\teacher|1|老师/}希望{\you|3|你/}努力用功。
I warn him not to be late .^{\I|0|我/}曾警告{\him|2|他/}不要迟到。
he allow the soldier to take him prisoner .^{\he|0|他/}允许士兵将{\him|6|他/}俘虏。
they have never known him to behave so badly .^{\they|0|他们/}从不{\known|3|知道/}{\him|4|他/}表现如此恶劣。
they believe him to be innocent .^{\they|0|他们/}相信{\him|2|他/}是{\innocent|5|无罪的/}。
do you consider her to be honest ?^{\you|1|你/}认为{\her|3|她/}{\honest|6|诚实/}吗？
I consider it to be a shame .^{\I|0|我/}认为这是一种羞耻。
tom 's teacher think him to be the cleverest boy in the class .^{\tom|0|汤姆/}的{\teacher|3|导师/}认为{\him|5|他/}是{\class|13|班级/}中最聪明的{\boy|10|男孩/}。
we prove him to be wrong .^{\we|0|我们/}证明了{\him|2|他/}是{\wrong|5|错误的/}。
I make him do it .^{\I|0|我/}使{\him|2|他/}做这件事。

Unit Translation Processing of One-to-One:

[They] use the advanced Bodiansoft [ITM] to translate [articles] .
[We] use the advanced Bodiansoft [CATM] to translate [books] .

Let us begin with Bodiansoft [ITM] to realize our [plan] .
Let us begin with Bodiansoft [CATM] to realize our [dream] .

Let us begin with [Bodiansoft-ITM] to realize our [plan] .
Let us begin with [Bodiansoft-CATM] to realize our [work target] .

Fig. 8A

Unit Translation Processing of One-to-Multi:

We use the [CAT] to translate [articles] .
We use the [advanced] [Bodiansoft ITM] to translate [patent] [documents] .

Fig. 8B

Unit Translation Processing of Multi-to-One:

[He] [and] [she] use the [advanced] [Bodiansoft] [CATM] to accumulate knowledge .
[They] use the [BD-CATM] to accumulate knowledge .

Fig. 8C

Unit Translation Processing of Multi-to-Multi:

We see the [self-learning] [result] of the BD-CATM and save one-third of time after two month.
We see the [wonderful] [reasoning] [effect] of the BD-CATM and save one-third of time after two month.

METHOD FOR PATTERNIZED RECORD OF BILINGUAL SENTENCE-PAIR AND ITS TRANSLATION METHOD AND TRANSLATION SYSTEM

TECHNICAL FIELD

The invention relates to the technical field of computer translation, and more particularly relates to a method for a patternized record of a bilingual sentence-pair, a translation method, and a translation system based on the bilingual patternized sentence-pair.

BACKGROUND OF INVENTION

Language translation is a kind of science, and a kind of art. Since there are many kinds of languages and each language has many changes and variations beside the rules, a lot of work of brain and inventiveness is needed for translating a language into another language. Since 1930s, the machine translation had been proposed. Along with the development of the computer technology, different kinds of computer translation systems and technology, such as ED (Electronic Dictionary), MT (Machine translation), TM (Translation Memory), IT (Interactive Translation) and CAT (Computer Aided Translation), are developed.

Those systems perform language translation in different ways. For example, the Electronic Dictionary can only translate a word, or look up a word in a dictionary.

Traditional MT technology performs language translation according to the grammar rules, wherein the grammar rules are summarized by the language specialists, and written into the translation program by the programmer, and amended only by the programmer. Such grammar rules can not cover all language phenomenons due to the richness and flexibility of language. Therefore, the translation quality of traditional MT technology is lower, especially for translation of a long sentence and a complicated sentence.

With rapid increase in the arithmetic speed of CPU and the storage capacity of record medium, the statistical machine translation technology (SMT) and translation memory (TM) technology have been proposed. The basic idea is storing vast amount of bilingual sentence-pair, and getting target text of input source sentence by extracting translated and stored portions from the bilingual sentence-pair. Translation memory technology is the right direction of high quality translation of the computer translation technology.

Figure 1A:
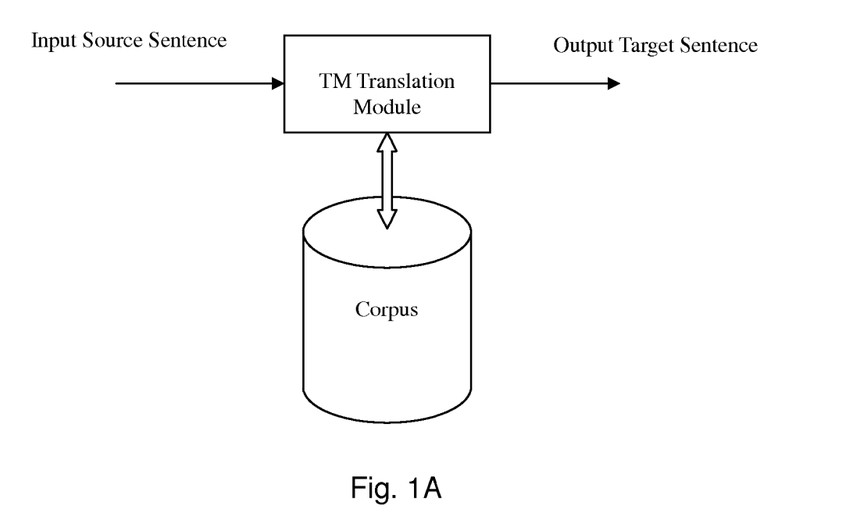
FIG. 1A is a flow chart of a technical solution of traditional TM computer translation technology.

FIG. 1A shows the translation scheme of the traditional TM translation technology. Therein, the TM translation module compares the input source sentence with the source part of the bilingual sentence-pair of the corpus (matching processing). If fully matched or preset match factor is satisfied, the target part of the bilingual sentence-pair is output as TM translation result.

Figure 1B:
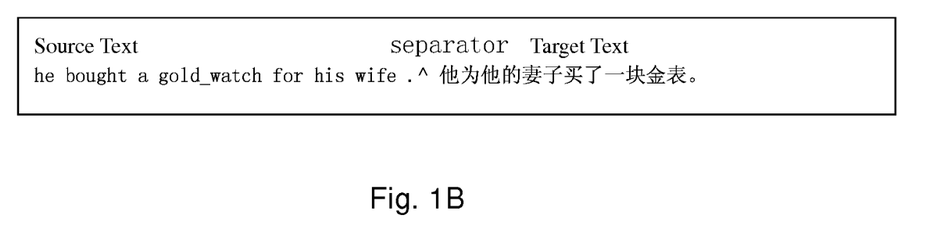
FIG. 1B is a schematic diagram of a sentence-pair recoded by traditional record method of a sentence-pair.

FIG. 1B shows an example of a sentence-pair recorded by the traditional sentence-pair record method. In the example, the source text is recorded in left part, and the target text is recorded in the right part, and there is a separator between the source text and target text. Therein, both of the source text and the target text comprise only simple content of text, such as words, characters, punctuation marks, etc., in corresponding languages. Therein, there is no information aimed to translation, in spite of the separator between the source text and the target text. Therefore, the effect of this kind of the sentence-pair is very limited. That is to say, the accurate translation result for a similar source sentence cannot be obtained from the sentence-pair, although the accurate translation result only for a same source sentence can be obtained from the sentence-pair.

Therefore, all of possible sentences, and in addition to the translated sentence-pairs, should be accumulated for the traditional TM technology to get an accurate translation result for a sentence. However, it is almost impossible to accumulate all sentence-pairs of a pair of languages due to the richness and flexibility, and arbitrariness of sentences written by different authors. This is to say that the amount of sentence/sentence-pair is unlimited or immeasurable. Practically, we had accumulated hundreds of thousands of sentence-pair in a professional field, with large cost of human power and money; however, there are only a few thousandths of coverage (repetition rate) during a test of translation. Therefore, the TM translation technology has a big obstacle. Thereby, the benefit of the traditional MT technology is recalled, that is to cover more sentence by less grammar rules or sentence templates. As a result, the MT technology is conjugated with the TM technology, so as to form a strategy of hybrid computer translation.

The inventor of this patent application has developed a computer intelligent translation system, which uses the technology of recording and storing the intellectualized sentence-pair, to improve the efficiency and coverage rate of the bilingual sentence-pair by means of artificial intelligence. For more information, please refer to the web site: www.aitrans.net.

In recent years, other modified TM technology has arisen, for example, the sentence templates are used in the TM solution, and it aims to cover more sentences by a sentence template stored in the base of sentence templates. The technology of a sentence template is that a translation example is abstracted into a sentence template which only reserves the syntax word and insert special symptom for fill-up, the syntactical analysis is performed on the input sentence and a syntax tree is created, then obtained the target text for the input sentence by comparing the syntax tree with the sentence template. This method actually goes back toward the traditional MT technology, because abstracting the translation sentence-pair into a syntax sentence template is a hard work which need much time and human labour, and can't be performed automatically. On the other hand, the uniqueness of sentence is lost and the accuracy of the translation of some special sentence is declined, although the coverage factor i.e. versatility of translation is improved by means of the sentence template. Due to the imperfect and no useful means for accumulating sentence templates, no practical example of this technology can be seen by now.

SUMMARY OF THE INVENTION

The object of the invention of the patent application is to provide a recording method of intellectualized sentence-pair based on a translation instance (or example), a relevant translation method, and a relevant translation system, so that the computer can perform advanced intelligent translation. The intellectualized sentence-pair is not only a translation instance but also a translation pattern, so that it has the versatility of translation pattern while keeping the uniqueness of the translation sentence-pair.

The inventor of the invention has proposed a theory and a system for simulating the human's brain to memory or store the translation knowledge by a computer, on the basis of the study of human's brain and foreign language learning of many years. And many methods and systems to implement and apply the intellectualized knowledge base are invented.

The accumulation of knowledge for the intellectualized knowledge base may be user-oriented by using these methods and systems, which break down the difficulties in the technical field of computer intelligent translation which exists since last century, so that the user can update the intellectualized knowledge base which is not fixed in the software. It overcomes the shortage of the traditional translation software in which the translation rules or sentence templates are established by the language specialist and programmed by the software professional, and let the intellectualized knowledge base develop and update quickly. Therefore, it is a feasible technology to reach the high quality of the machine translation.

The major aspects of the invention are the method for a patternized record of a bilingual sentence-pair, the translation method, and the translation system based on the bilingual patternized sentence-pair.

According to a first aspect of the invention, a method for a patternized record of a bilingual sentence-pair, for recording a source sentence and a corresponding target sentence onto a record medium in a mapping manner is provided, which includes recording the source sentence into the first part in the record medium, and recording the target sentence into the second part in the record medium; recording at least one regular unit and/or one patternized unit in at least one of the first part for recording a source sentence and the second part for recording a target sentence; wherein, in the patternized unit, the content of a unit in own language part and the information of a corresponding unit in the corresponding language part are recorded in a predetermined format; the regular unit and patternized unit can be identified automatically by a computer. The patternized unit comprises: a language text portion (a source portion and/or target portion), a POS portion, an attribute portion and/or a portion of serial number of a unit, or any combination thereof. Each portion in the patternized unit can be identified automatically by a computer.

According to the method for a patternized record of a bilingual sentence-pair, wherein, the regular unit and the patternized unit are recorded in the second part for recording the target sentence; a content of target portion and corresponding source information are recorded in the patternized unit; the corresponding source information comprise: a content of source portion, and a POS of the content of source portion, an attribute of the content of source portion, and/or a portion of serial number of a corresponding unit in the source sentence, or any combination thereof.

The regular unit and patternized unit are recorded in the first part for recording the source sentence; a content of source portion and the POS and/or attribute of the source portion are recorded in a predetermined format. The regular unit and patternized unit are recorded in the first part for recording source sentence; in the patternized unit, the content of source portion and the corresponding target information are recorded in a predetermined format; the target information comprises: a content of target portion, a POS of the content of the target portion, an attribute of the content of the target portion, and/or a serial number of a corresponding unit in the target sentence, or any combination thereof.

According to the method for a patternized record of a bilingual sentence-pair, wherein, the required information for a patternized unit is collected by means of a interactive translation module or computer-aided translation module of a translation software, to form a required patternized unit, and the patternized unit is send to the patternized sentence-pair.

According to a second aspect of the patent application, a translation method based on a bilingual patternized sentence-pair is provided, wherein the bilingual patternized sentence-pair is recorded by means of the method for a patternized record of a bilingual sentence-pair in the first aspect of the patent application; the translation method comprises: receiving an input source sentence, performing matching between the input source sentence and the bilingual patternized sentence-pair; if a preset matching criterion is satisfied, a target part of the bilingual patternized sentence-pair is withdraw; for a mismatched text unit, determining whether a unit the mismatched text unit corresponds to is a regular unit or a patternized unit; if the unit the mismatched text unit corresponds to is a patternized unit, unit translation processing is performed on the patternized unit of the target part. The result after all unit translation processing is completed is output as the target text of the received input sentence.

According to the translation method based on a bilingual patternized sentence-pair, wherein match modes comprise: a regular match mode, a patternized match model and an advanced intelligent match mode.

According to the translation method based on a bilingual patternized sentence-pair, wherein the unit translation processing comprises looking up the source portion in a dictionary, replacing the target portion, and/or replacing corresponding source text information, and de-patternizing. The unit translation module may adopt the following unit translation processings: such as one-to-one, one-to-multi, multi-to-one, multi-to-multi, one-to-zero, and zero-to-one.

According to a third aspect of the patent application, a translation system based on a bilingual patternized sentence-pair is provided, wherein the bilingual patternized sentence-pair is recorded by means of the method for a patternized record of a bilingual sentence-pair in the first aspect of the patent application, the translation system comprises: a matching module, a unit translation processing module, and an intelligent knowledge base; the intelligent knowledge base mainly comprises: a sentence library for storing the bilingual patternized sentence-pairs; a thesaurus for recording source text, paraphrases, POSs and/or attributes; and relationship information between the sentence library and the thesaurus; the matching module receives an input source sentence and the bilingual patternized sentence-pair from the sentence library, and performs the matching processing between the input source sentence and the bilingual patternized sentence-pair; if a preset matching criterion is satisfied, the target part of the bilingual patternized sentence-pair, and/or source sentence, and/or mismatched text unit are sent to the unit translation processing module; the unit translation processing module, receives the mismatched text unit, determines the unit the mismatched text unit corresponds to is a regular unit or a patternized unit; if the unit the mismatched text unit corresponds to is a patternized unit, the unit translation processing is performed on the patternized unit of the target part. After all the unit translation processing is completed, the result is output as the target text of the received input sentence.

According to the translation system based on a bilingual patternized sentence-pair, wherein the translation system further comprises a match mode control module in order to control the matching module working in a predetermined match mode, a regular match mode, a patternized match mode, or an advanced intelligent match mode; the match mode control module may be integrated into the matching module, so that the matching module becomes a specific matching module, i.e. it performs the matching processing with specifically predetermined match mode.

According to the translation system based on a bilingual patternized sentence-pair, wherein the translation system further comprises a preprocessing module, for preprocessing an input source text according to a format and a matching requirement specified for the knowledge base, and sends the preprocessed source text to the matching module. A plurality of bilingual patternized sentence-pairs and additional information for searching and matching are recorded in the sentence library; the translation system further comprises a sentence library search module, for searching in the knowledge base according to the input source text or the preprocessed source text information, so as to find out required bilingual patternized sentence-pair from the sentence library. The sentence library search module may be integrated into the matching module, so that the searching and the matching are conjugated advantageously.

According to the translation system based on a bilingual patternized sentence-pair, wherein the unit translation module performs: looking up the source portion in a dictionary, replacing the target portion, and/or replacing corresponding source text information, and de-patternizing. The unit translation module may adopt the following unit translation processing: such as one-to-one, one-to-multi, multi-to-one, multi-to-multi, one-to-zero, and zero-to-one.

Aspects, modes and embodiments of the invention will be described in detail by reference to the drawings.

EMBODIMENTS

Method for a Patternized Record of a Bilingual Sentence-Pair

The first aspect of the invention is a method for a patternized record of a bilingual sentence-pair, for recording a bilingual sentence-pair into record medium in a patternized manner. Usually, a bilingual sentence-pair comprise: a source sentence in a first language (also referred as first language source sentence), and a target sentence in a second language (also referred as second language target sentence). Usually, the first language source sentence is simply called as source text; the second language target sentence is simply called as target text, because the second language target sentence is the translation result of the first language source sentence.

In the invention, the content of a bilingual sentence-pair, especially the target text, may be a manual translation result of a person by hand, a hybrid translation result of a person with a computer translation tool, or an automatic translation result of a computer automatic translation tool. For the source text or source sentence, it can be a simple sentence, a complicated sentence, a word combination, a phrase, or a short sentence, etc. That means there is no limit to the source sentence in its length and structure.

The record medium can be a computer-readable storage medium, such as: hard-disk, optical-disk, USB memory, and etc. It can also be traditional record medium, such as: paper sheet, magnetic tape etc. The format of record or storage may be text file, database or any one of other formats.

In this application, the word "record" should be understood as "record and/or store". In some significance, "record" equates to "memory".

The method for a patternized record of a bilingual sentence-pair of the invention can be used in a computer translation system, especially used for the record and storage of sentence library in the computer translation system. Certainly, it can be also used in other fields or aspects, such as collection for corpus on Internet.

Figure 2A:
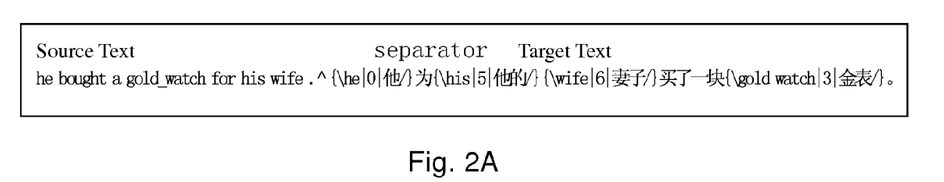
FIGS. 2A-2C, and FIGS. 3A-3C show examples of bilingual patternized sentence-pair recoded by a method for a patternized record of a bilingual sentence-pair according to the invention, which are used to describe various embodiments of the method for a patternized record of a bilingual sentence-pair.
Figure 2B:
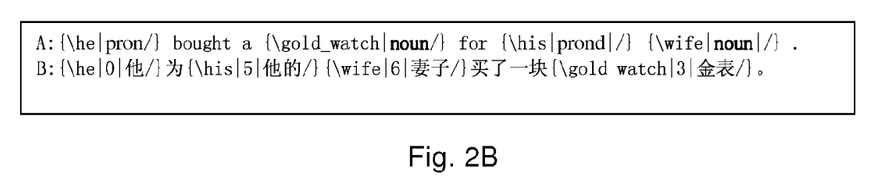
Figure 2C:
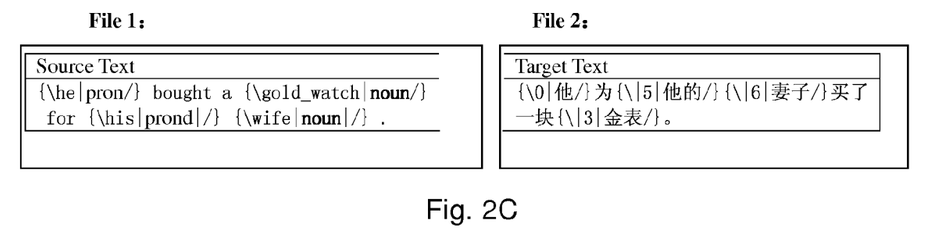
Figure 3A:
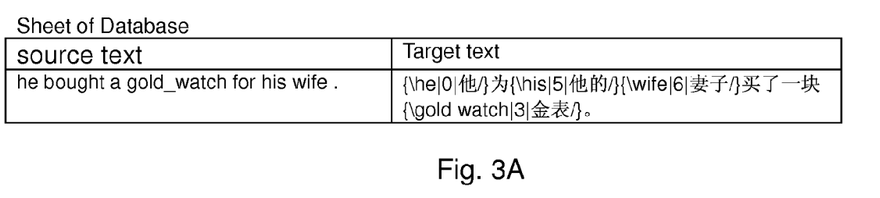
Figure 3B:
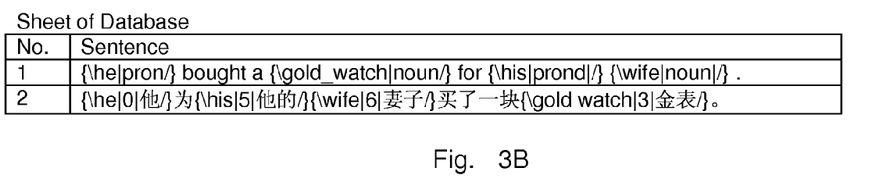
Figure 3C:
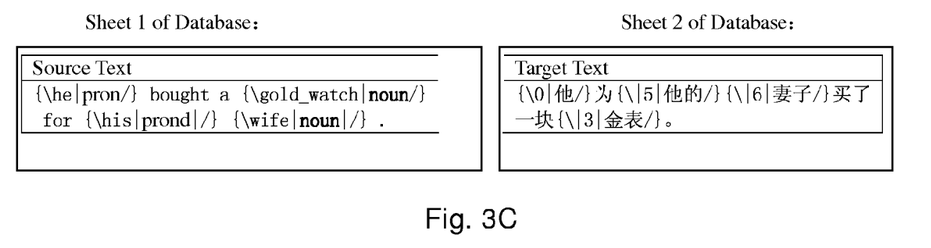

FIG. 2-3 is used to describe various embodiments of the method for a patternized record of a bilingual sentence-pair of the invention.

According to the method for a patternized record of a bilingual sentence-pair of the invention, the source text (i.e. the first language) is recorded in first part, and the target text (i.e. the second language) is recorded in second part. When a file format is used for storage, the first part and the second part can be in one file, for example, the first part and the second part are in same row with a specific separator between them, as shown in FIG. 2A. Alternatively, the first part and the second part may be located in adjacent two rows respectively, for example, the first part is in an odd row and the second part is in an even row, as shown in FIG. 2B. Furthermore, in case of file format, as shown in FIG. 2C, the first part and the second part may be recorded in different files, and there is a corresponding/mapping relationship between the first part and the second part of the same sentence-pair, for example, they have same row number.

When a database format is used for storage, the first part and the second part may be located in one sheet. For example, the first part and the second part are located in same row but in different columns, as shown in FIG. 3A. Alternatively, the first part and the second part may be located in adjacent two rows respectively, for example, the first part is in an odd row and the second part is in an even row, as shown in FIG. 3B.

Furthermore, in case of database form, as shown in FIG. 3C, the first part and the second part can be recorded in different sheets, and there is a corresponding/mapping relationship between the first part and the second part of the same sentence-pair, for example, they have same row number.

According to the method for a patternized record of a bilingual sentence-pair of the invention, at least one regular unit and/or one patternized unit is recorded at least in one of the first part and the second part. In the patternized unit, the content of a unit in own language part (for example, the second part for recording target sentence) and information of a unit in corresponding language part (for example, the first part for recording source sentence) are recorded in a predetermined format. The regular unit and patternized unit can be identified automatically by a computer. The patternized unit comprises: a language text portion (source portion and/or target portion), a POS portion, an attribute portion and/or a portion of serial number of a unit, etc., or any combination of the above-mentioned portions/information items. Those portions (information items) in the patternized unit can be identified automatically by a computer.

Specifically, in the target text recorded in second part, not only the regular unit is recorded but also the patternized unit is recorded. The regular unit means an invariable unit, i.e. a unit of regular target text, such as "为", "买了", "一块"("买了一块" may also be considered as a regular unit or regular unit block). The patternized unit means a replaceable unit in which the target text can be replaced by other content. The following are examples of the patternized units shown in FIG. 2-3: {\he|0|他/}, {\his|5|他的/}, {\wife|6|妻子\}, {\gold watch|3|金表/}.

A sentence-pair with the patternized unit(s) is called patternized sentence-pair. The amount of the regular units and the amount of the patternized units, and their positions may be arbitrary, and depend on the syntax structure of a sentence and the need of translation. A patternized sentence-pair usually has one or more regular units, and one or more patternized units. The position relationship between the regular unit and the patternized unit may be interleaved each other, or several regular unit in serial and several patternized unit in serial are interleaved each other.

Also a patternized sentence-pair may have only regular units, in this case, the sentence-pair is common sample sentence-pair (see FIG. 1), wherein there is no any patternization information, which may be a special example of the patternized sentence-pair. In this specific situation, the patternized sentence-pair equals to the traditional sentence-pair, i.e. it is just a translation instance.

Also a patternized sentence-pair may only comprise the patternized unit(s), for example:

{\lazy|adj/}  {\boy|n|/}  {\V!|f|/}^{\lazy|0|懒惰的/} {\boy|1|男孩/} {\!|2|!/}

The patternized unit is recorded in a predetermined format. The purpose of adopting the predetermined format (patternized format) is that the patternized unit can be identified automatically by a computer, and each portion/information in the to patternized unit can also be identified and handled automatically, such as the target portion can be replaced.

According to the requirement, the patternized unit may comprise various portions, such as a source portion, a target portion, a POS portion, an attribute portion and a portion of serial number of a unit, so as to make an exact and desired replacement. In the target text, the target portion of the patternized unit is called as a basic portion, and the rest are called as additional portion/information. The following are examples of the patternized unit in different formats: "他 |he|pronoun|0", {\gold watch|3|金表 |noun|物品/}, {\wife|6|妻子/}. Therein, "他", "金表", "妻子" are the contents of the target portions; "he", "gold watch", "wife" are the contents of the source portions; "pronoun" and "noun" are the contents of the POS portions; "0", "3", and "6" are contents of the portions of serial numbers of the units in the source sentence, which begins with "0" in order to comply with computer programming.

Specific separator, such as "|", "^", space character or tab character etc. may be used to separate different portions in the patternized unit. The purpose is to get better and easy recognition and processing when use the patternized sentence-pair for computer translation. Each patternized unit may be marked/labeled by a pair of special symbols, such as: "{" and "}", "{\" and "/}" and etc., so as to easily recognize the patternized unit.

In the example of FIG. 2A, the second part (target text) has some patternized units: {\he|0|他/}, {\his|5|他的/}, {\wife|6|妻子/}, {\gold watch|3|金表/}. Although there is no patternized unit marked in first part, those words or word combinations (phrases) in first part which are referred in the patternized units in the second part (target text) are implied to be replaceable. They are "he" in the position #0, "his" in the position #5, "wife" in the position #6, and "gold-watch" in the position #3.

Furthermore, in the source text recorded in the first part, not only the regular unit is recorded, but also the patternized unit may be recorded. The regular unit means invariable unit, i.e. regular source text unit. The patternized unit means replaceable unit, i.e. those unit of source text which may be replaced by other content. Similarly, the amount of the regular units and the amount of the patternized units, and their positions may be arbitrary, and depend on the syntax structure of the sentence and the need of translation.

The patternized unit is recorded in a predetermined format. The purpose of "patternization" is to let the source portion of a patternized unit can be replaced. According to the requirement, in addition to the source portion, the patternized unit may comprise various additional portions/information, such as the POS portion/information of the content of the source portion, the attribute portion/information of the content of the source portion, so as to take an exact and desired replacement. Preferably, the additional portion/information of the patternized unit in the first part (source text) is complementary to the additional portion/information of the patternized unit in the second part (target text). Furthermore, the patternized unit in first part (source text) is preferably created at same time of creating the corresponding patternized unit in second part (target text).

As shown in FIGS. 2B and 2C, there are some examples of the marked patternized unit i.e. replaceable word or word combination (phrase) in the first part (source text). As shown in these Figs., the formats of the pattenized unit are as follows: {\he|pron/}, {\gold_watch|noun/}, {\his|prond/}, {\wife|noun|/}. Certainly, other formats may be used, by which the word or phrase can be identified and replaced.

Furthermore, in the patternized unit of the first part, i.e., the source sentence, in addition to the content of source portion, the corresponding target information may be recorded as the additional information in a predetermined format. The target information comprises: a content of target portion, a POS of the content of target, an attribute of the content of target and/or a serial number of a corresponding unit in the target text (target sentence), or any combination of said-above information, which are recorded in the corresponding portions in the patternized unit, i.e. the target portion, the POS portion, the attribute portion, the portion of serial number of unit.

Figure 5:
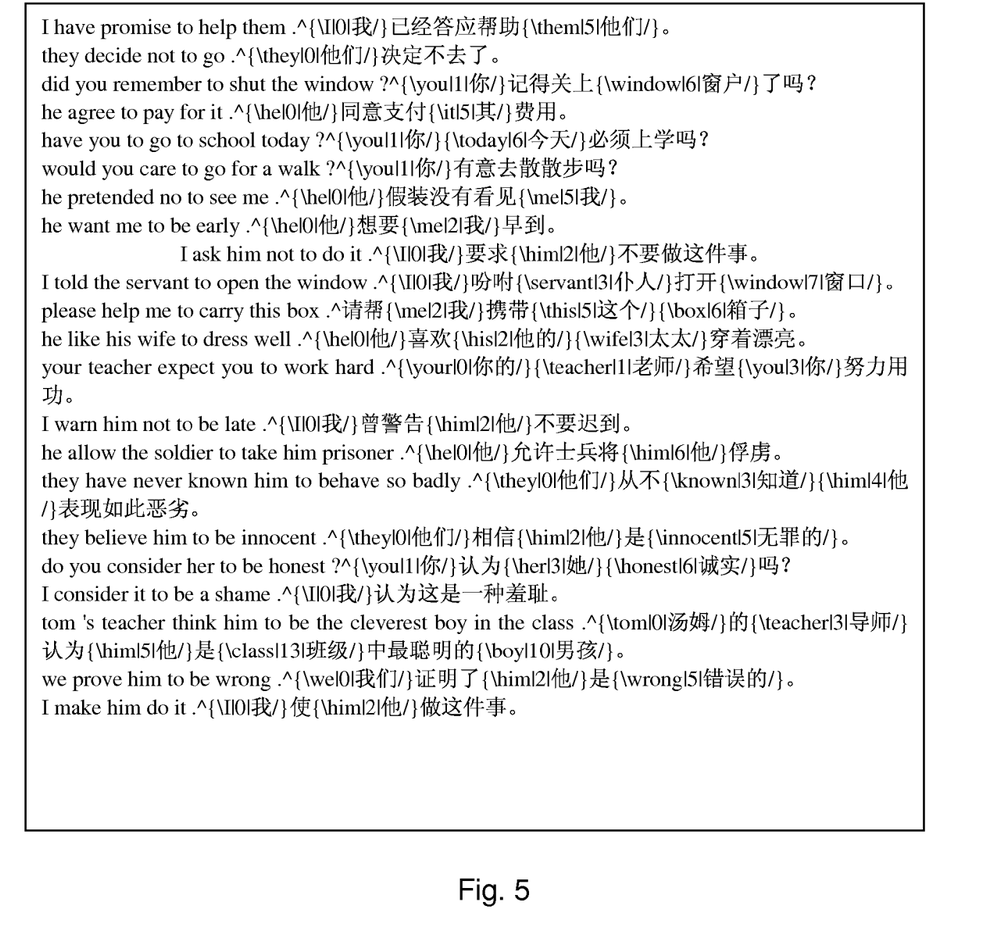
FIG. 5 is a list of patternized sentence-pairs recoded by the method for a patternized record of a bilingual sentence-pair according to the invention.

FIG. 5 is a list of patternized sentence-pair recorded by the method for a to patternized record of a bilingual sentence-pair according to the invention.

Figure 4:
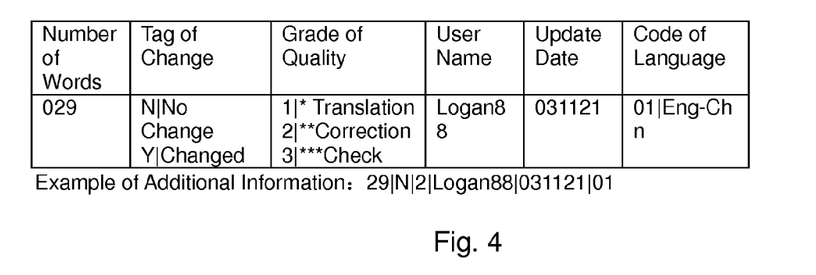
FIG. 4 is an example of a bilingual patternized sentence-pair with additional information.

In order to further use the above-mentioned patternized sentence-pair, some further additional information can be recorded in it, such as: amount of units of the sentence, amending tag, quality grade, username, update date, code of language and etc., as shown in FIG. 4. The additional information can be located in the beginning, end, or other position, as long as it has corresponding relation with the patternized sentence-pair.

Since the patternized unit is in predetermined format, the information for intelligent translation processing is added. Conversely, in term of the predetermined format, a particular translation instance may be obtained after removing the additional information.

Therefore, it can be seen from foregoing description that the patternized sentence-pair recorded with the method for a patternized record of a bilingual sentence-pair of the invention is not only a translation instance but also a translation model (similar to template). Therefore, it has the uniqueness of the specific translation sentence-pair, while keeps the universality of translation pattern. By using the patternized sentence-pair, regular match-translation for input source sentence can be made so as to assure the distinctive translation requirement for the particular sentence, patternized match-translation for input source sentence can also be realized, and advanced intelligent translation can also be archived, as described in the second part of the present patent application. Additionally, in the method for a patternized record of a bilingual sentence-pair of the invention, there is no need of abstracting operation (in which a lot of thinking about syntax and inductiveness work and a lot of rules are needed) on the bilingual sentence-pair created in translation processing, and only some existing information is needed to be added into the bilingual sentence-pair in the procedure, so that the method is easily accomplished by the computer. For example, in the translation process with translation software, the information needed for the patternized unit is collected by means of interactive translation (IT) module or computer aided translation (CAT) module, then the required patternized unit is formed and added to the patternized sentence-pair.

Beside simple and easy, the patternized unit is comparative intuitional and can be understand by normal translator (translation software user), so that the normal translator (translation software user) will be accustomed to use the method for a patternized record of a bilingual sentence-pair according to the invention.

[Translation Method Based on a Bilingual Patternized Sentence-Pair]

Figure 6:
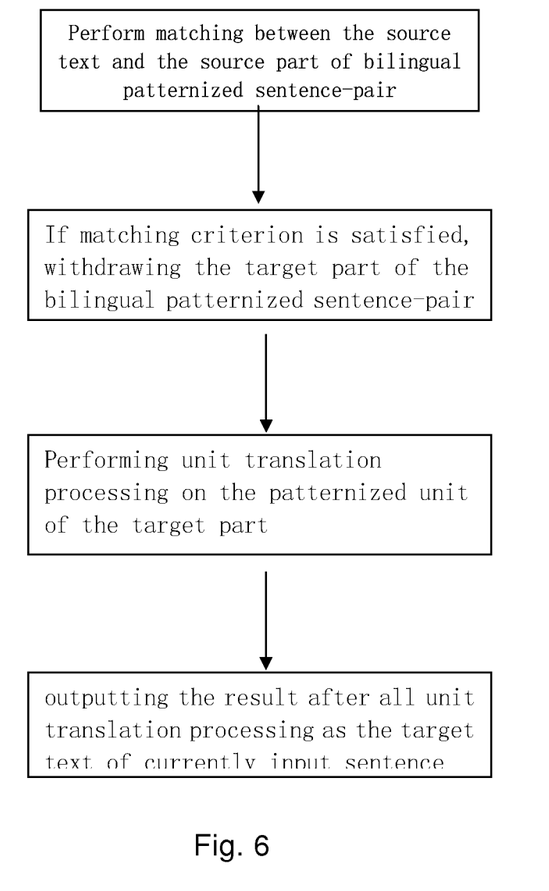
FIG. 6 is a flow chart of a translation method based on a bilingual patternized sentence-pair according to the invention.

The translation method based on a bilingual patternized sentence-pair according to the second aspect of the present application will be described in detail with reference to FIG. 6.

A translation method based on a bilingual patternized sentence-pair according to the invention is disclosed, wherein, the bilingual patternized sentence-pair is created and recorded by the above-mentioned method for a patternized record of a bilingual sentence-pair.

Firstly, receiving an input source sentence, performing matching between the input source sentence and the bilingual patternized sentence-pair. In sake of convenience, the input source sentence is called as "input source text", the source part in the bilingual patterned sentence-pair is called as "reference source text".

The reference source text may be the reference source text which is de-patternized (i.e. the additional information in the patternized unit is removed), so that the comparison operation can be simplified. The sentence alignment comparing manner, or unit array comparison manner and etc. can be used to carry out the matching method.

The unit and position comparing manner can be used in the matching method. In this manner, if the content of a unit at a position (with a serial number of unit) in the input source text is same to the content of the unit at the same position (with the same serial number of unit) in the reference source text, it is determined that the unit in the input source text matches with the corresponding unit of the reference source text, i.e. the unit is a matched unit, otherwise the unit is not matched (i.e., it is a mismatched unit). If all of the units in the input source text are matched with all of the units in the reference source text, it is determined that the input source text is matched fully with the reference source text. If some units are matched and some units are not matched, the match factor M can be obtained by the following formula, which is a key parameter to determine whether the reference source text is desired.

$$M=(Nhit/SUMref)*\%\qquad\text{Formula 1}$$

Wherein, Nhit is the amount of matched units in the reference source text; SUMref is the total amount of units in the reference source text.

Figure 8A:
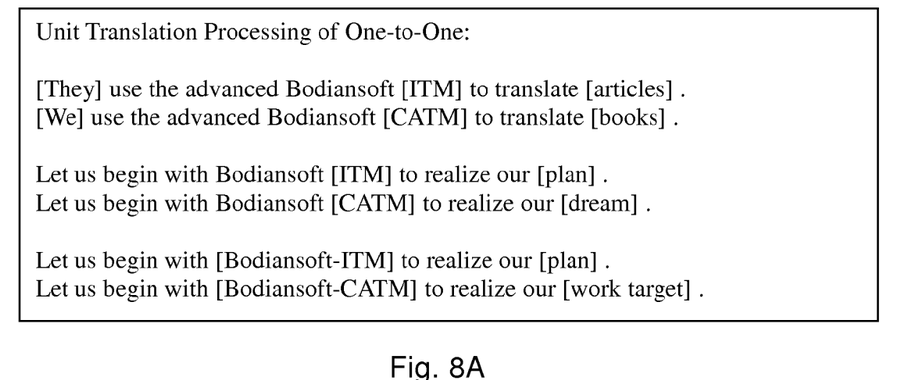
FIGS. 8A-8D schematically show several manners of unit translation processing respectively.

FIG. 8A shows several examples of match manner, wherein, the pair of "[" and "]" is used to label the mismatched unit.

In the first example, the input source text is: "They use the advanced Bodiansoft ITM to translate articles." and, the reference source text is: "We use the advanced Bodiansoft CATM to translate books."

Since "They" and "We" at position #0, "ITM" and "CATM" at position #5, and "articles" and "books" at position #8 are not matched each other, the amount of mismatched units is 3. The total amount of units in the reference source text is SUMref=10 (including punctuation character), then, the amount of matched units is Nhit=10-3=7, therefore, the match factor M=(7/10)*%, i.e. M=70%, wherein, the match factor M is calculated according to the correspondence with the reference source text.

Because the reference source text is come from the patternized sentence-pair, the patternized match can be carried on for the input source text, the patternized match factor m which is in correspondence with reference source text can be calculated according to the patternized match manner. The formula of computation is as follows:

$$m=(Bhit/SUMref)\qquad\text{Formula 2}$$

Wherein, Bhit is the amount of matched units in the reference source text; SUMref is the total amount of regular units in the reference source text.

For the first example of FIG. 8A, the units at position #0, position #5 and position #8 are all patternized units, the rest units (including all regular units) are matched, so the patternized match factor m which is in correspondence with reference source text is 100%.

Thereby, it is seen that the patternized match factor of input source text can be significantly raised by using the bilingual patternized sentence-pair, and correct translation result can be obtained through the following described unit translation processing.

Two matching manners and corresponding algorithms of match factor are discussed above, however, other matching manners and algorithms of match factor can also be used in the invention, according to the specific requirement of translation. Therein, the algorithm of match factor should be associated with a matching manner, or depends on the matching manner. About more advanced matching manners or matching algorithms, there are some considerations: the amount of units of the input source text may be used; the words and phrases in the input source text may be normalized firstly; unit matching may extend to various variants of a word; different match weight may be given to regular unit and patternized unit, respectively, etc. Furthermore, the said matching manner and matching algorithm may be modified according to the processing manner described in the following, referred as one-to-multi, multi-to-one, and multi-to-multi, etc.

A translation method based on a bilingual patternized sentence-pair according to the invention is disclosed, wherein, after the above-mentioned matching step, the target part of the bilingual patternized sentence-pair is withdrew if the preset match criterion is satisfied.

The match criterion may be specific match requirement for certain match mode. For example, in regular match mode, the match criterion is satisfied if the match factor is greater than or equal to a preset value, such as 70%. In patternized match mode, the match criterion is, for example, that all regular units are matched. According to various translation requirements, various match modes may be designed and various relevant match criterions may be determined.

According to the translation method based on a bilingual patternized sentence-pair, after the above-mentioned step of withdrawing target part, whether a unit the mismatched text unit corresponds to is a regular unit or a patternized unit is determined. If the mismatched text unit corresponds to a patternized unit, then, the patternized unit in the target part is suffered unit translation processing.

Figure 7:
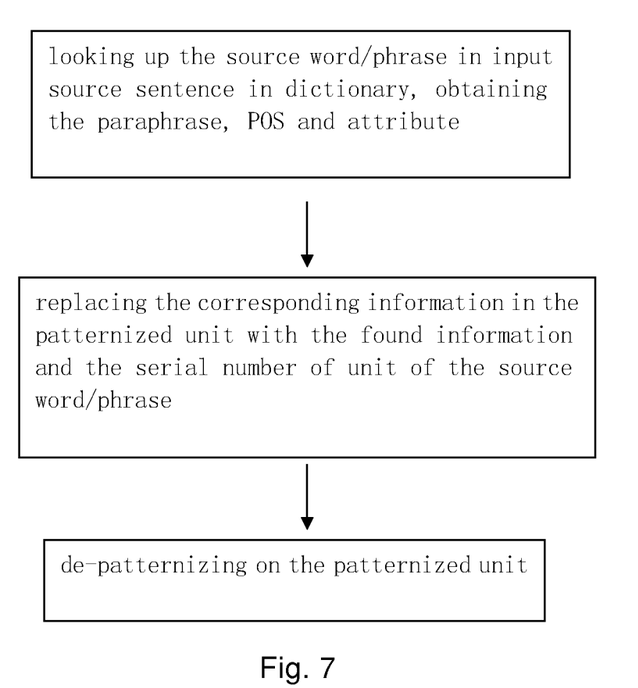
FIG. 7 is a flow chart of the unit translation processing of the translation method shown in FIG. 6.

As shown in FIG. 7, the unit translation processing comprise: searching the source portion in a dictionary, replacing the target portion.

Searching in a dictionary for source portion may be regularly looking-up in an electronic dictionary (or thesaurus, lexicon), i.e. by using the source text content (such as a word, a word combination or a phrase) of the source portion, finding out corresponding interpretation/translation and explanation, therein additional information such as POS, attribute, characteristic are included.

Replacing a target portion is for replacing the content of the target text in the patternized unit with the found paraphrase/translation. When there is a plurality of paraphrases, the first paraphrase can be selected and used for the replacing operation.

If needed, the unit translation processing may also include replacing corresponding source information and de-patternizing. The replacing corresponding source information may mean that replacing the additional information of the patternized unit with the additional information found out from the dictionary or thesaurus. The de-patternizing means removing the additional information from the patternized unit, so as to show a clear translation result.

After unit translation processing for all patternized units in the target part, the result is just the target text of currently-input sentence. Furthermore, the target text can be output for further processing and showing.

With reference to the first example in FIG. 8A, the translation method based on a bilingual patternized sentence-pair will be described in detail.

In the example, the patternized bilingual sentence-pair is as follows:

reference source text: {\We|pron/} use the advanced Bodiansoft {\CATM|n|/} to translate {\books|n/}.

reference target text: {\We|0| 我们 /} 利用先进Bodiansoft {\CATM|5|CATM/} 来翻译 {books|8| 书 /}.

The above-mentioned source text is de-patternized, the result is the simplified reference source text: "We use the advanced Bodiansoft CATM to translate books."

Matching processing is preformed between the input source text "They use the advanced Bodiansoft ITM to translate articles." and the above-mentioned reference source text. The matching result is "They" and "We" at position #0, "ITM" and "CATM" at position #5, and "articles" and "books" at position #8 are not matched, the amount of mismatched units is 3. The total amount of units in the reference source text is SUMref=10 (including punctuation character), then, the amount of matched units is as Nhit=10-3=7, therefore, the match factor in conformity with reference source text M=(7/10)*%, i.e. M=70%. Furthermore, the units at position #0, #5 and #8 are all patternized unit, that means all regular units in the reference source text are matched, then the patternized match factor, in conformity with reference source text, m is 100%.

Assuming the match criterion is a combined match algorithm criterion, such as, the regular match factor M should be equal or greater than 70% and the patternized match factor m should be 100%, then the above-mentioned input source sentence is satisfied with the match criterion, therefore, the target part of the sentence-pair is withdrawn.

Next, the unit translation processing is preformed throughout the target part. For example, the unit translation processing is preformed firstly on the unit #0 which is "我们". According to the steps of the unit translation processing, firstly, in the dictionary or thesaurus, searching the word "They" at position #0 in the input source text, obtained the searching result "他们 |pron|*|*". Therein, "他们" is the paraphrase of the word "They", "pron" is the POS, "*" represents other characteristics and/or other additional information. After the step of searching, the replacing operation is preformed, wherein the target text "我们" in the patternized unit is replaced by the paraphrase "他们" which is looked up in the step of searching. If needed, the replacing operation of related source text may be preformed, that is to say the source text "We" of the patternized unit is replaced by the word "They" in the input source text. Therefore, following new patternized unit is obtained {\They|0| 他们 /}. Similarly, if needed, de-patternizing operation may be preformed on the above-mentioned new patternized unit, and obtain the unit translation result "他们" of the patternized unit. In same way, the unit translation processing is performed on other patternized unit. Finally, the translation result or target text is obtained, which is: "他们利用先进的 Bodiansoft ITM 来翻译文章".

It is seen from the particular example that the above-mentioned method for a patternized record of a bilingual sentence-pair according to the first aspect of the present patent application is similar to the way of learning the syntax of foreign language and remembering the knowledge of translation in human's brain. That is to say, those fixed and syntax-belonged units of a sentence, such as: verb, preposition, and fixed combination of them, customized usage, special usage, special sentence, etc., are remembered/recorded fixedly, as invariable units. However, those units having universality, such as: noun as subject, noun as object, noun following preposition, adjective, numeral, pronoun, simple verb, specific noun, professional term, and word combination without special syntax phenomenal, are remembered/recorded in patternized manner, as variable unit or replaceable unit. For example, the following is an example of above-mentioned patternized sentence-pair, wherein some variable units is recorded and the rest units are the invariable units.

．　　．　　．　　{\We|0|我们/} 利用先进的 Bodiansoft {\CATM|5|CATM/} 来翻译 {\books|8|书/}

Therefore, the patternized sentence-pair of the invention is not only a translation instance but also a translation model. When translation is performed by using the patternized sentence-pair, it will be easy and efficient, and one patternized sentence-pair can be used for translation of many new sentences. Actually, by means of one patternized sentence-pair, thousands of similar sentences can be translated correctly. For example, in the example, the unit "我们" in the reference sentence-pair can be replaced by the unit at position #0 in the input source text sentence if only it is a pronoun. The units {\CATM|5|CATM/} and {\books|8|书/} of the reference sentence-pair can be replaced respectively by the unit #5 and unit #8 of the input source sentence if only they are noun. And the result after such replacements is a result of correct translation.

Figure 8B:
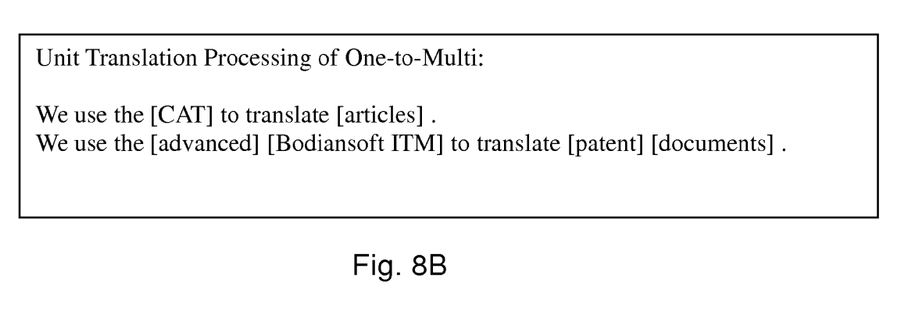
Figure 8C:
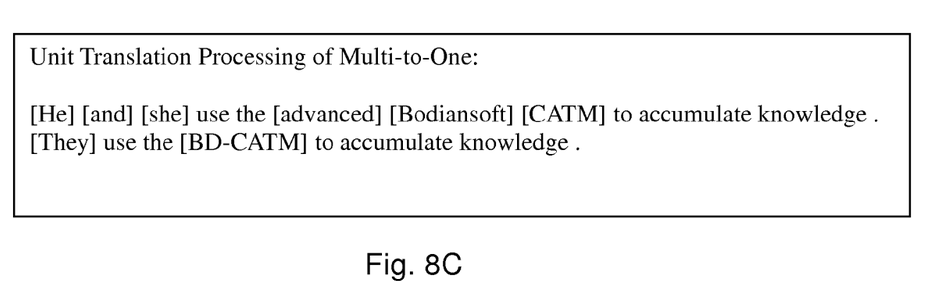
Figure 8D:
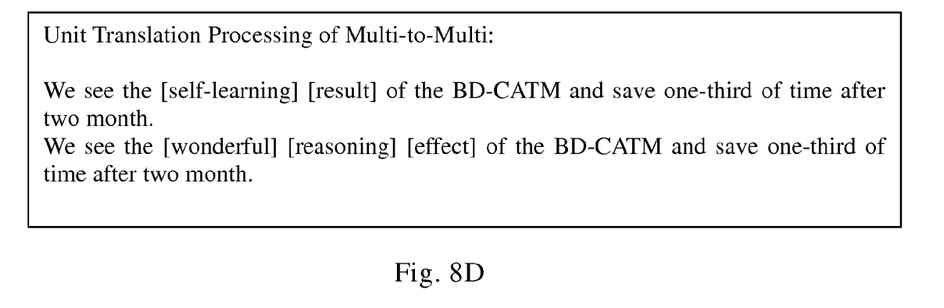

The simple unit translation processing has been explained in the above description, it is alike to the reasoning of one-to-one logic in human's brain. In order to further utilize the said patternized sentence-pair of the present patent application, the unit translation processing can be extend to advanced or complex translation processing, such as: one-to-multi, multi-to-one, multi-to-multi replacement, etc. FIG. 8B-8D schematically show the above-mentioned manners respectively, wherein, in each sentence-pair, upper half part is the reference source text, while the lower half part is the input source sentence.

FIG. 8B schematically shows the one-to-multi manner of unit translation processing. Therein, the unit "CAT" at position #3 in the reference source text can not be found in the input source text, i.e. there is no corresponding match unit in the input source text. However, the unit "advanced" at position #3 and the unit "Bodiansoft ITM" at position #4 (assuming that "Bodiansoft ITM" is a word combination in the thesaurus) are all replaceable units. Therefore, the unit "advanced" at position #3 and the unit "Bodiansoft ITM" at position #4 can be recognized as a combined unit and is corresponding with the unit "CAT" at position #3 in the reference source text. In this case, various replacing manners can be adopted in the unit translation processing, as long as the target text of "CAT" (such as "计算机辅 助翻译软件") is replaced by the target text of "advanced" and "Bodiansoft ITM" (such as "先进的 Bodiansoft ITM"). Also, the unit "articles" at position #6 in the reference source text can not be found in the input source text, i.e. there is no corresponding match unit in the input source text. However, the unit "patent" at position #6 and unit "documents" at position #7 (these positions are the result after combining the "advanced" at position #3 and "Bodiansoft ITM" at position #4 as a unit) are replaceable units. Therefore, the unit "patent" at position #6 and the unit "documents" at position #7 can be recognized as a combined unit and is corresponding with the unit "articles" at position #6 in the reference source text, by the logic of supposition. In this case, various replacing manner manners can be adopted in the unit translation processing, as long as the target text of "article" (such as "文章") is replaced by the target text of "patent" and "document" (such as "专利文献").

FIG. 8C schematically shows the multi-to-one manner of unit translation processing. The idea of multi-to-one processing is similar to the above-discussed one-to-multi manner, if only the reference source text and the input source text are considered reversely each other. Therefore, no more description will give to avoid redundancy.

FIG. 8D schematically shows the multi-to-multi manner of unit translation processing. The idea of multi-to-multi processing is similar to those of the above-discussed one-to-multi and multi-to-one. In the multi-to-multi processing, more than one unit translation processing of one-to-one, one-to-multi or multi-to-one may be included. It is a kind of synthesized logic reasoning.

Additionally, for other unit translation processing, such as one-to-zero and zero-to-one, "deleting" and "inserting" processes can be used for those processing.

[Translation System Based on a Bilingual Patternized Sentence-Pair]

The translation system based on a bilingual patternized sentence-pair of the invention will be described with reference to FIG. 9-12. The bilingual patternized sentence-pair is recorded by means of the method for a patternized record of a bilingual sentence-pair according to the first aspect of the present patent application.

Figure 9:
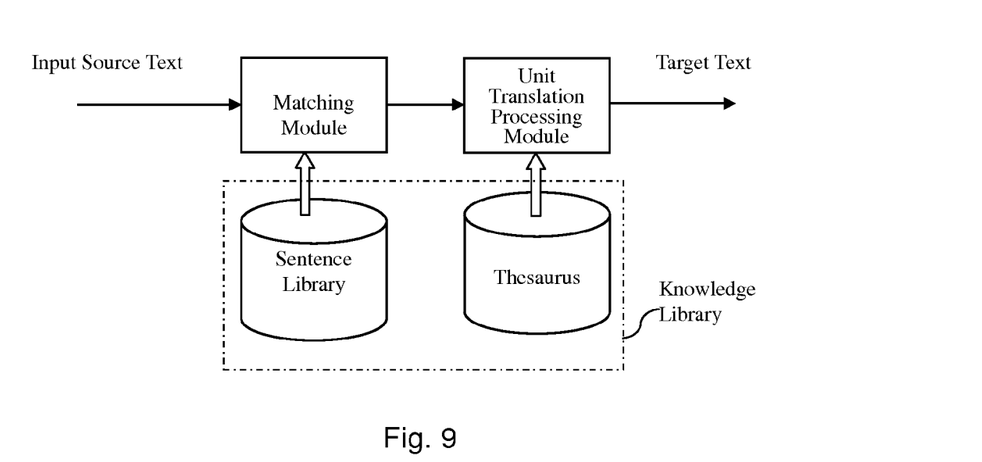
FIG. 9 shows the first embodiment of the translation system based on a bilingual patternized sentence-pair according to the invention.

As shown in FIG. 9, the translation system based on a bilingual patternized sentence-pair include: matching module, unit translation processing module, and intelligent knowledge base. The knowledge base mainly comprise a sentence library which stores the bilingual patternized sentence-pairs, a thesaurus (i.e. a dictionary) which records source text units, paraphrases, POSs and/or attributes, as well as the relationship information of the sentence library and the thesaurus. The intelligent knowledge base further comprises an index list for searching in the sentence library, in order to search the needed sentence-pair fastly. The matching module receives an input source sentence and the bilingual patternized sentence-pair from the sentence library, and performs the matching processing between the input source sentence and the bilingual patternized sentence-pair. If the result of matching meets match criterion, the input source sentence, and the target part and/or the source part (i.e., source sentence) of the bilingual patternized sentence-pair, and/or the mismatched text units are sent to the unit translation processing module. About the matching and matching criterion, please refer to the detailed description for the translation method based on a bilingual patternized sentence-pair in the second aspect of the patent application.

The unit translation processing module, receives the mismatched text unit, determines whether the unit the mismatched text unit corresponds to is a regular unit or a patternized unit; If the unit the mismatched text unit corresponds to is a patternized unit, the unit translation processing is performed on the patternized unit of the target part. After all of the unit translation processing are completed, the result is output as the target text of currently input source sentence.

Figure 10:
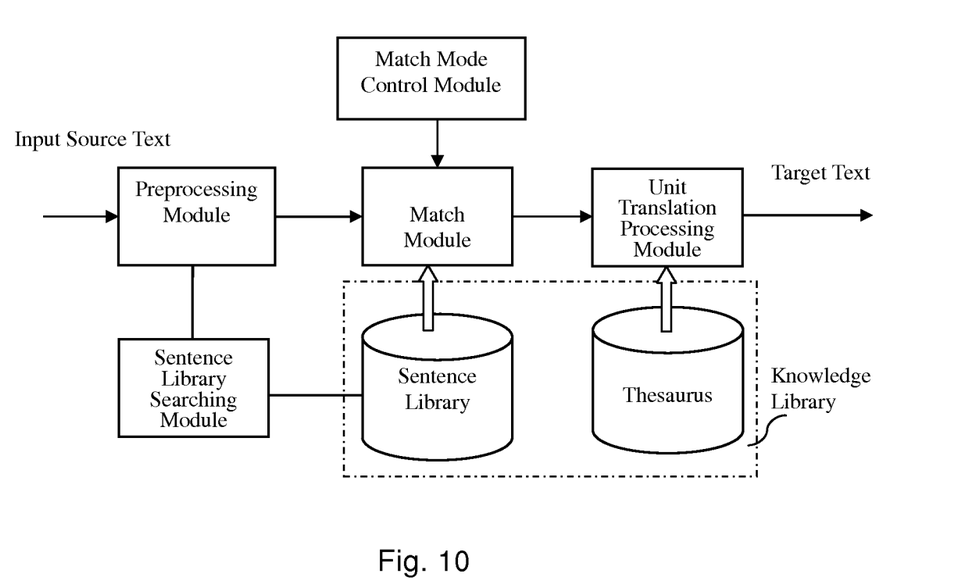
FIG. 10 shows the second embodiment of the translation system based on a bilingual patternized sentence-pair according to the invention.

According to a preferable embodiment of the invention, the translation system based on a bilingual patternized sentence-pair further comprises match a mode control module (as shown in FIG. 10) in order to control the matching module working in a predetermined match mode. The predetermined match mode may be a regular match mode or a patternized match mode. The match mode and algorithm can be combined with various advanced unit translation processing manners discussed in the second aspect of the patent application, so as to form more advanced intelligent match modes.

The match mode control module shown in FIG. 10 can be integrated into the matching module, so that the matching module becomes a specific matching module, i.e. it performs the matching processing with specifically predetermined match mode.

According to another preferable embodiment of the invention, the translation system based on a bilingual patternized sentence-pair further comprises preprocessing module (as shown in FIG. 10), for preprocessing on the input source text according to the format and matching requirement specified in the knowledge base, and sends the input source text preprocessed to the matching module.

Furthermore, in the translation system based on a bilingual patternized sentence-pair of the invention, a plurality of bilingual patternized sentence-pairs (as shown in FIG. 5) and additional information for search and match (as shown in FIG. 4) are recorded in the sentence library.

As shown in FIG. 10, according to the preferred embodiment of the invention, the translation system based on a bilingual patternized sentence-pair of the invention further comprises a sentence library search module, for searching in the knowledge base according to the input source text or the preprocessed source text information and find out the required bilingual patternized sentence-pair(s) from the sentence library.

Figure 11:
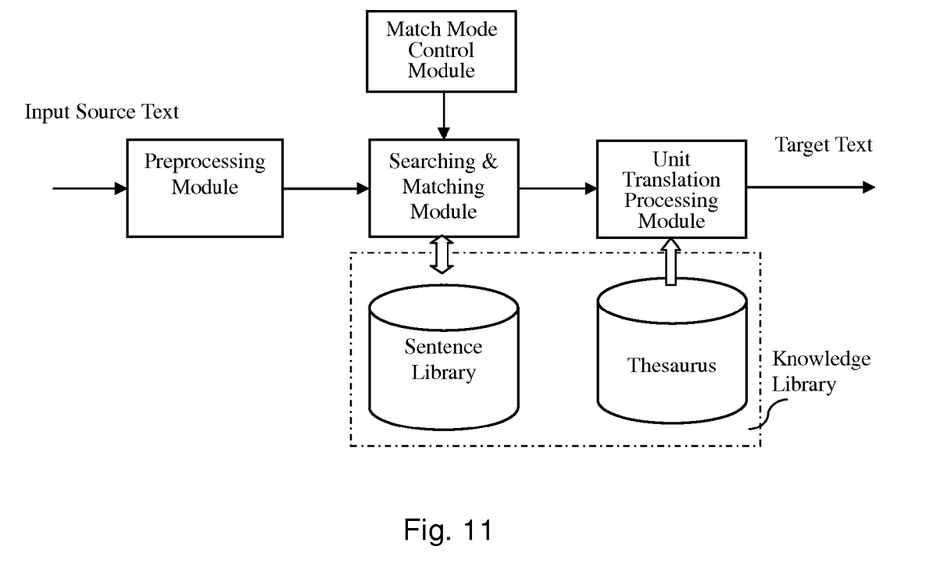
FIG. 11 shows the third embodiment of the translation system based on a bilingual patternized sentence-pair according to the invention.

The sentence library search module can be integrated into the matching module, so that the searching and the matching can be conjugated advantageously. The embodiment as shown in FIG. 11 is formed, wherein the searching and matching module performs the sentence library searching and the sentence matching processing. Specifically, the flow of processing may be that searching firstly, and then performing the matching after finding out the required patternized sentence-pair. Otherwise, performing search while performing matching, until the best patternized sentence-pair which is needed is found out.

Figure 12:
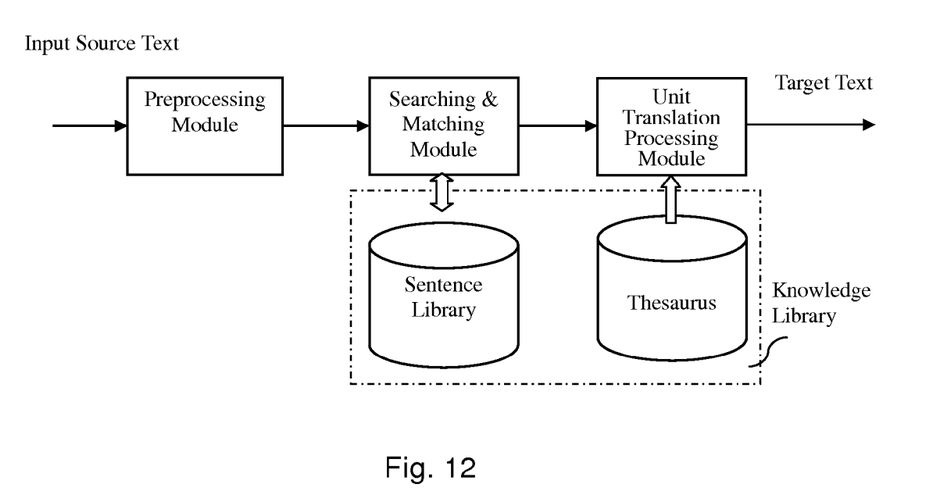
FIG. 12 shows the fourth embodiment of the translation system based on a bilingual patternized sentence-pair according to the invention.

The match mode control module shown in FIG. 11 can be also integrated into the searching and matching module, so that the embodiment shown in FIG. 12 is formed.

The above-mentioned unit translation module performs: looking up the source portion in dictionary, replacing the target portion, replacing the relevant source text information, and/or de-patternizing. For detailed description about above-mentioned processing, please refer to the detailed description for the translation method based on a bilingual patternized sentence-pair in the second aspect of the patent application. The unit translation module may adopt the one of following unit translation processing: such as one-to-one, one-to-multi, multi-to-one, multi-to-multi, one-to-zero, and zero-to-one. For detailed description about above-mentioned processing, please refer to the detailed description for the translation method based on a bilingual patternized sentence-pair in the second aspect of the patent application. Each aspect of the patent application and various embodiments have been described in detail. It can be seen from those description, that the invention adopts the artificial intelligence technology, i.e. the mode, manner and method of thinking, which are similar to human's brain, to perform the recording and translating processing. Especially, the method for a patternized record of a bilingual sentence-pair according to the first aspect of the patent application is an easy, efficient and advanced recording/storing method of sentence-pair, and it provides a feasible solution for the design and construction of intelligent knowledge base (sentence library). By means of this kind of intelligent knowledge base, more and advanced artificial intelligence translation processing can be carried out, as described in the second and third aspects of the patent application. In the practice and developing work, it is also be prove that the intellectualized knowledge base and intellectualized translation method and system in this patent application is really feasible, and have practical applicability in broad field.

Although, each aspect and embodiment have been described above, the invention of the patent application is not limited in those. Various change, variation and modification can be made by the person skilled in the art. As long as those change, variation and modification do not deviate from the spirit and principle, they should be included in the scope of the invention.

What is claimed is:

1. A method for a patternized record of a bilingual sentence-pair, for recording a source sentence and a corresponding target sentence onto a record medium in a mapping manner, comprising:
   recording a source sentence into a first part in the record medium, and recording a target sentence into a second part in the record medium;
   recording at least one patternized unit in at least one of the first part for recording the source sentence and the second part for recording the target sentence;
   in the patternized unit, a content of a unit in the source sentence and information of a corresponding unit in the target sentence or a content of a unit in the target sentence and information of a corresponding unit in the source sentence are recorded in a predetermined format;
   wherein the patternized unit can be identified automatically by a computer;
   wherein the patternized unit comprises: a source portion, a target portion, a POS portion, an attribute portion and/or a portion of serial number of a unit, or any combination of said portions;
   wherein each portion in the patternized unit can be identified automatically by a computer.

2. The method for a patternized record of a bilingual sentence-pair according to claim 1, wherein, the at least one patternized unit is recorded in the second part for recording the target sentence; a content of the target portion and a corresponding source information are recorded in the patternized unit; wherein the corresponding source information comprises: a content of the source portion, a POS of the content of the source portion, an attribute of the content of the source portion, and/or a serial number of a corresponding unit in the source sentence, or any combination thereof.

3. The method for a patternized record of a bilingual sentence-pair according to claim 1, wherein the at least one patternized unit is recorded in the first part for recording the source sentence; and in the patternized unit, a content of the source portion and the POS and/or the attribute of the content of the source portion are recorded in a predetermined format.

4. The method for a patternized record of a bilingual sentence-pair according to claim 1, wherein the at least one patternized unit is recorded in the first part for recording the source sentence; in the patternized unit, a content of the source portion and corresponding target information are recorded in a predetermined format; the corresponding target information comprises: a content of the target portion, a POS of the content of the target portion, an attribute of the content of the target portion and/or a serial number of a corresponding unit in the target sentence, or any combination thereof.

5. The method for a patternized record of a bilingual sentence-pair according to claim 1, wherein required information for the patternized unit is collected by means of an interactive translation module or computer-aided translation module of a translation software, to form a required patternized unit, and the patternized unit is sent to the patternized sentence-pair.

6. A translation method based on a bilingual patternized sentence-pair, carried out by a translation system comprising a matching module, a unit translation processing module, and an intelligent knowledge base, comprising:
receiving, by the matching module, an input source sentence and a bilingual patternized sentence-pair from the intelligent knowledge base;
performing, by the matching module, matching processing between the input source sentence and a source part of the bilingual patternized sentence-pair;
wherein if a preset matching criterion is satisfied, a target part of the bilingual patternized sentence-pair is withdrawn;
for a mismatched text unit, determining, by the unit translation processing module,
whether a unit the mismatched text unit corresponds to is a regular unit or a patternized unit;
if the unit the mismatched text unit corresponds to is a patternized unit, a unit translation processing is performed on the patternized unit of the target part;
wherein the result after all unit translation processing is completed is output as a target text of a received input sentence.

7. The translation method based on a bilingual patternized sentence-pair according to claim 6, wherein the matching module comprises: a regular match mode, a patternized match model and an advanced intelligent match mode.

8. The translation method based on a bilingual patternized sentence-pair according to claim 6, wherein the unit translation processing comprises looking up the source portion in a dictionary, replacing the target portion, and de-patternizing.

9. The translation method based on a bilingual patternized sentence-pair according to claim 6, wherein one of the following manners is adopted for the unit translation processing: one-to-one, one-to-multi, multi-to-one, multi-to-multi, one-to-zero, zero-to-one, or any combination of them.

10. A translation system based on a bilingual patternized sentence-pair, comprising:
a matching module, a unit translation processing module, and an intelligent knowledge base;
wherein the intelligent knowledge base comprises: a sentence library for storing bilingual patternized sentence-pairs; thesaurus for recording source text, paraphrases, POSs and/or attributes; and relationship information between the sentence library and the thesaurus;
wherein the matching module receives an input source sentence and the bilingual patternized sentence-pair from the sentence library, and performs the matching processing between the input source sentence and the bilingual patternized sentence-pair; wherein if a preset matching criterion is satisfied, a target part of the bilingual patternized sentence-pair, and/or a mismatched text unit are sent to the unit translation processing module;
wherein the unit translation processing module receives the target part of the bilingual patternized sentence-pair and the mismatched text unit, determines whether the unit the mismatched text unit corresponds to is a regular unit or a patternized unit; wherein if the unit the mismatched text unit corresponds to is a patternized unit, a unit translation processing is performed on the patternized unit of the target part; after all the unit translation processing is completed, the result is output as the a target text of a received input sentence.

11. The translation system based on a bilingual patternized sentence-pair according to claim 10, further comprising a match mode control module in order to control the matching module working in one of predetermined match modes, wherein the predetermined match modes comprise: a regular match mode, a patternized match mode and an advanced intelligent match mode;
wherein the match mode control module is integrated into the matching module, so that the matching module becomes a specific matching module performing the matching processing with a specifically predetermined match mode.

12. The translation system based on a bilingual patternized sentence-pair according to claim 10, further comprising a preprocessing module, for preprocessing an input source text according to a format and a matching requirement specified for the knowledge base, and sending the preprocessed source text to the matching module.

13. The translation system based on a bilingual patternized sentence-pair according to claim 10, wherein
a plurality of bilingual patternized sentence-pairs and additional information for searching and matching are recorded in the sentence library;
wherein the translation system further comprises a sentence library search module, for searching in the intelligent knowledge base according to an input source text or preprocessed source text information, so as to find out a required bilingual patternized sentence-pair from the sentence library;
wherein the sentence library search module is integrated into the matching module, so that the searching and the matching is conjugated advantageously.

14. The translation system based on a bilingual patternized sentence-pair according to claim 10, wherein the unit translation module performs: looking up a source portion in a dictionary, replacing a target portion, and de-patternizing.

15. The translation system based on a bilingual patternized sentence-pair according to claim 10, wherein one of the following manners is adopted for the unit translation module: one-to-one, one-to-multi, multi-to-one, multi-to-multi, one-to-zero, zero-to-one, or any combination of them.

* * * * *